Patented Jan. 13, 1942

2,269,608

UNITED STATES PATENT OFFICE 2,269,608

PREPARATION OF FINELY DIVIDED SYNTHETIC MINERALS

J. Glenn Strieby, Appleton, Wis., assignor to Paper Patents Company, Neenah, Wis., a corporation of Wisconsin No Drawing. Application July 5, 1938, Serial No. 217,642

2 Claims. (Cl. 23—129)

The present invention relates to synthetic minerals and more particularly to the preparation of inorganic filler or pigmenting material for use in paper coatings, fillings and the like.

It is essential that the mineral in coating compositions be of fine particle size and this is particularly necessary when operating under the Germanson-Kranhold coating process described in U. S. Patent No. 1,918,095, dated July 11, 1933. In addition, paper filled or coated with mineral filler or pigmenting material of fine particle size has been found to possess a higher brightness than paper filled or coated with a like amount of similar material of a relatively large particle size. The paper industry have been struggling for years in attempts to find a practical process for producing finely divided pigmenting material.

The principal object of my invention is to provide a process for preparing mineral filler and coating material of fine particle size.

Other objects will be apparent from the following detailed description.

I have discovered that inorganic filler and pigmenting material of fine particle size and particularly suitable for use in the paper industry may be prepared by synthesizing mineral filler or pigment in the presence of sugar. More specifically, I have discovered that improved compositions may be prepared by the formation and precipitation of alkaline earth salts in aqueous sucrose solutions. Included in my invention are the various insoluble alkaline earth salts such as the barium, magnesium and calcium salts and various combinations of the same.

The following examples will serve to illustrate my invention:

Example I

Calcium Sulfite

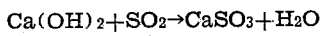

In this example sulfur dioxide gas is passed into a milk of lime suspension containing about 160 grams per liter calcium hydroxide and 5-10 percent sucrose based on the weight of the calcium hydroxide. The milk of lime suspension preferably has a starting temperature of about 70°-80° C. and the gas is passed into the suspension which is subjected to vigorous agitation at such a rate that a batch of 1700 pounds of calcium hydroxide is converted to calcium sulfite in 3 to 7 hours. A pH value of about 5.5 is considered the end point. The sulfur dioxide used in the formation of this pigment may be obtained by burning sulfur.

Example II

Calcium Carbonate

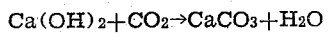

In this example carbon dioxide gas is passed into a milk of lime suspension containing about 50 grams per liter calcium hydroxide and about 1-5 percent sucrose based on the weight of the calcium hydroxide. The milk of lime suspension is preferably maintained at a temperature of 25° to 40° C. and the suspension subjected to vigorous agitation until the reaction is complete.

The optimum amount of sugar i. e. sucrose, required to produce precipitates of the desired particle size may vary with the particular type of pigment to be prepared as well as with the various conditions under which the pigments are being formed. For example, the sucrose may be used in from 1 to 20 or even 50 percent, although for commercial operation a percentage of 5 to 10 percent based on the weight of the alkaline earth e. g. lime, is ordinarily preferred. Lower percentages of sucrose e. g. 1 to 5 percent, have been found satisfactory for preparing calcium sulfite when high concentrations of lime are used (180-200 grams per liter), while low percentages of sucrose have also been found satisfactory for preparing calcium carbonate when low concentrations of lime are used. Although my invention is not to be limited by theoretical explanations, my investigations indicate that the sugar does not function as a "protective colloid" but forms an alkaline earth saccharate which influences solubility relations rendering favorable the formation of very small crystals of precipitates.

While the presence of the sucrose, during the formation and precipitation of the mineral pigment is of great aid in obtaining the desired particle size, my investigations have also shown that vigor and type of agitation, temperature, concentration, rate of gassing, etc. are all factors influencing particle size. For example, although it will be obvious to those skilled in the art that vigorous agitation of the reaction medium is necessary to obtain a reaction product of fine particle size, my investigations have shown that the agitation should preferably be such as to intimately and vigorously mix the reaction ingredients at the point at which the sulfur dioxide or carbon dioxide gas for example is introduced into the milk of lime suspension. My investigations have also shown that high temperatures i. e. above 60° C. (e. g. 60° to 90° C.) favor the formation of calcium sulfite of fine particle size while low temperatures i. e. below 50° C. (e. g. 20° to 50° C.) favor the formation of calcium carbonate of fine particle size.

My investigations have also shown that high concentrations of milk of lime, e. g. 150–200 grams per liter favor the formation of calcium sulfite pigments of fine particle size, while low concentrations, e. g. 50–100 grams per liter favor the formation of calcium carbonate pigments of fine particle size. In commercial operation I have found a concentration of about 160 grams per liter to be preferred for preparing the sulfite pigment as the suspension becomes difficult to agitate when the end point is neared if higher concentrations of lime are employed. In addition, my investigations have indicated that rapid gassing with sulfur dioxide and carbon dioxide favor the formation of precipitates of fine particle size.

To evaluate the particle size of the various precipitates I employ a sedimentation test which depends on the application of the well known Stokes law. In carrying out the tests the pigments are dispersed in water using 8 grams of pigment per liter of suspension, specified amounts of suitable dispersing agents, e. g. casein, being added to assist in dispersion. A specified amount of the dispersion is then placed in a container provided with a brass disc suspended in the dispersion from one arm of an analytical balance. The pigment settling out on the disc is weighed on the balance and from the percent settling out versus time relation effective particle size in any desired units can be calculated from Stokes law. For comparative purposes it is sufficient to express the test in terms of percent settling out in unit time. My tests have shown that 40 to 55 percent of the ordinary commercial pigments prepared without sucrose settle out in 20 minutes, while only about 13–25 percent of the pigment prepared in accordance with my invention using sucrose settles out in the same period of time. My laboratory tests on calcium sulfite pigment prepared in accordance with my preferred process show that only about 11 percent of the pigment settles out in 20 minutes.

The importance of finely divided pigments in the paper industry may be illustrated by the following:

1. Paper filled with 20 percent calcium sulfite of such fineness that 14 percent settles out in 20 minutes is 3.1 to 3.3 points brighter (G. E. reflectance meter) than is a similar sheet of paper filled with 20 percent calcium sulfite of such fineness that 52–54 percent settles out in 20 minutes.

2. Paper filled with 20 percent pigment consisting of 60 percent calcium sulfite and 40 percent aluminum phosphate is 3.7 to 4.4 points brighter when the calcium sulfite is such that 18 to 24 percent settles out in 20 minutes than a similar sheet of paper filled with the same amount of calcium sulfite and aluminum phosphate pigment when the calcium sulfite is such that 54 percent settles out in 20 minutes.

It will be understood by those skilled in the art that my invention is not limited to the above examples. It will be further understood that my invention is not limited to any particular order of addition of the reaction products as my invention is intended to include all alkaline earth precipitates formed in a reaction medium containing sucrose as above described.

I claim:

1. A method of producing finely divided calcium sulfite for use in coating and filling paper, which comprises passing sulfur dioxide accompanied by vigorous agitation into an aqueous reaction medium containing 1 to 20 percent sucrose and a milk of lime suspension having a temperature above 60° C. and a concentration of about 150 to 200 grams of lime per liter of reaction medium.

2. A method of producing finely divided calcium sulfite for use in the coating of paper, which comprises passing sulfur dioxide gas accompanied by vigorous agitation into an aqueous reaction medium containing 5 to 10 percent sucrose and a milk of lime suspension having a temperature of about 60° to 90° C. and a concentration of about 160 grams of lime per liter of reaction medium.

J. GLENN STRIEBY.